United States Patent
Darade et al.

(10) Patent No.: US 11,225,158 B2
(45) Date of Patent: Jan. 18, 2022

(54) MEDIATOR SYSTEM AND METHOD FOR CONTROLLING A CHARGING CONTROL NETWORK

(71) Applicant: Proterra Inc., Burlingame, CA (US)

(72) Inventors: Nilesh Darade, San Mateo, CA (US); Joseph Frascati, Oakland, CA (US)

(73) Assignee: PROTERRA INC., Burlingame, CA (US)

( * ) Notice: Subject to any disclaimer, the term of this patent is extended or adjusted under 35 U.S.C. 154(b) by 16 days.

(21) Appl. No.: 16/806,048

(22) Filed: Mar. 2, 2020

(65) Prior Publication Data
US 2021/0268924 A1  Sep. 2, 2021

(51) Int. Cl.
B60L 53/00 (2019.01)
B60L 53/30 (2019.01)
B60L 58/10 (2019.01)
B60L 53/53 (2019.01)
B60L 50/60 (2019.01)

(52) U.S. Cl.
CPC ............. *B60L 53/305* (2019.02); *B60L 53/53* (2019.02); *B60L 58/10* (2019.02); *B60L 50/66* (2019.02); *Y02T 90/167* (2013.01)

(58) Field of Classification Search
CPC ........ B60L 53/305; B60L 53/53; B60L 58/10; B60L 50/66; Y02T 90/167
See application file for complete search history.

(56) References Cited

U.S. PATENT DOCUMENTS

| 7,864,780 | B1  | 1/2011 | Satapati |             |
|-----------|-----|--------|----------|-------------|
| 9,300,152 | B2* | 3/2016 | Juhasz   | B60L 53/63  |
| 9,667,742 | B2* | 5/2017 | Weng     | G06N 5/02   |
| 10,176,891| B1* | 1/2019 | LaBorde  | H04W 4/02   |

(Continued)

FOREIGN PATENT DOCUMENTS

EP   1300809 A1   4/2003

OTHER PUBLICATIONS

Karpenko; "Practical Use of O-MI/O-DF messaging standards in mobile application for IoT"; Master's Thesis; Espoo; Sep. 18, 2017; pp. 1-78.*

(Continued)

*Primary Examiner* — Naum Levin
(74) *Attorney, Agent, or Firm* — Bookoff McAndrews, PLLC

(57) ABSTRACT

A control system for a charging control network may include a primary server system that applies a control process to an Electric Vehicle Supply Equipment ("EVSE"), a secondary server system that applies a monitoring process to the EVSE, and a mediator system that maintains a virtualized connection there-between. The mediator system may: in response to receiving a first request from the EVSE, selectively route the first request to one or more server systems based on predetermined rules; in response to receiving at least one first reply, selectively route only one of the at least one first reply to the EVSE; in response to receiving a second request from one of the server systems directed toward the EVSE, route the second request to the EVSE; and, in response to receiving a second reply to the second request, route the second reply to the server system that transmitted the second request.

20 Claims, 8 Drawing Sheets

(56) References Cited

U.S. PATENT DOCUMENTS

| | | | |
|---|---|---|---|
| 2010/0094496 A1* | 4/2010 | Hershkovitz | B60L 3/12 |
| | | | 701/22 |
| 2014/0152254 A1 | 6/2014 | Juhasz | |
| 2018/0176272 A1* | 6/2018 | Zur | H04L 65/80 |
| 2019/0056745 A1* | 2/2019 | Meehan | A61G 5/1051 |
| 2020/0225655 A1* | 7/2020 | Cella | G06N 3/0472 |
| 2021/0029247 A1* | 1/2021 | Hardebeck | H04L 65/1096 |
| 2021/0039517 A1* | 2/2021 | Kramer | B60L 53/66 |
| 2021/0152414 A1* | 5/2021 | Busbee | H04L 63/08 |

OTHER PUBLICATIONS

Extended European Search Report dated Jul. 6, 2021 in counterpart European Patent Application No. 21159428.8 (10 pages, in English).

* cited by examiner

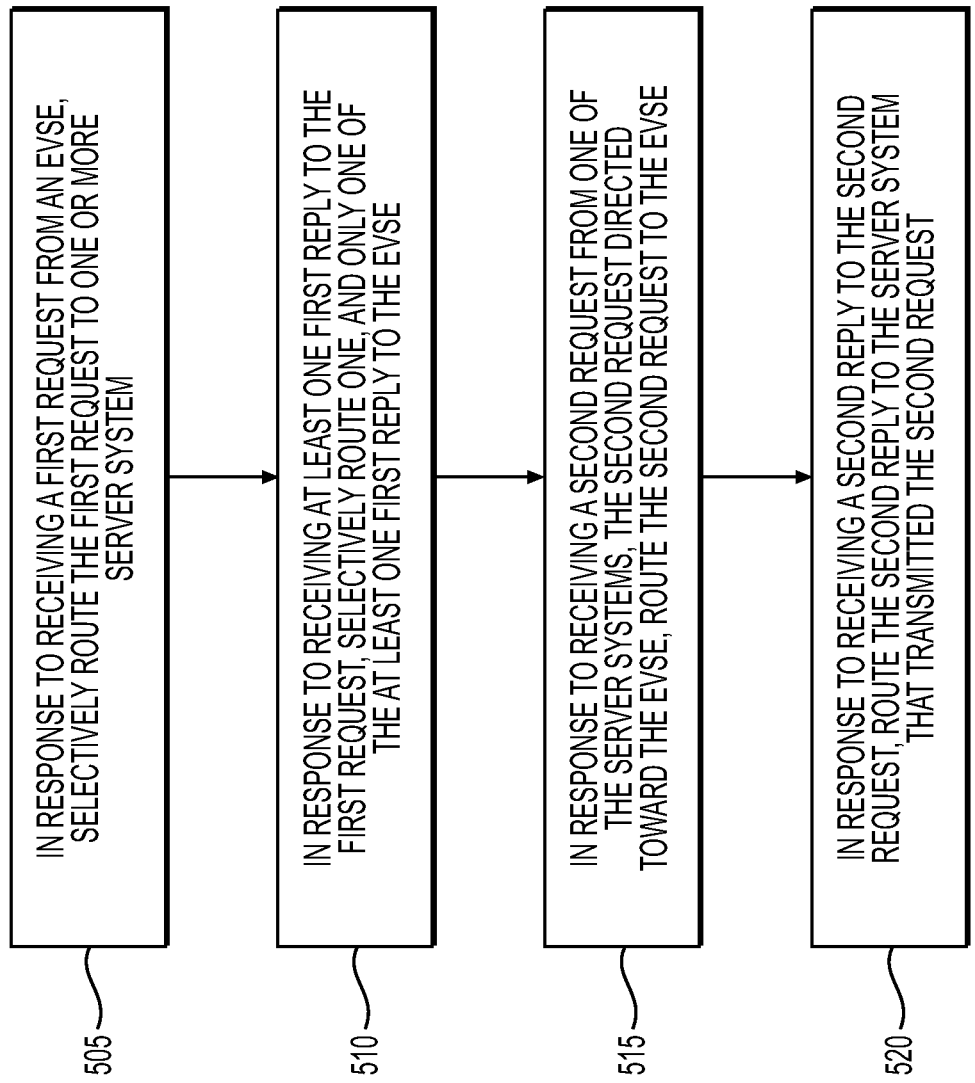

MEDIATOR SYSTEM AND METHOD FOR CONTROLLING A CHARGING CONTROL NETWORK

TECHNICAL FIELD

Various embodiments of the present disclosure relate generally to electric vehicle charging station networking and, more particularly, to systems and methods for managing electric vehicle supply equipment with more than one server system.

BACKGROUND

An electric vehicle (EV), also referred to as an electric drive vehicle, uses an electric motor (or traction motor) for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external power supply. Although the current disclosure is applicable, without limitations, to any type of electric vehicle, an exemplary case of an electric bus will be described to illustrate the features of the disclosed system.

In some applications, charging stations may be provided at a bus stop or another layover location to recharge the bus without inconveniencing passengers. At these charging stations, the electric bus couples with a charge dispenser, a charge head (e.g., an overhead charging arm or other mechanism of the charging station), etc. to direct external electric power to the bus to recharge the batteries. Charging stations may be unmanaged, i.e., stand-alone and/or autonomous devices connected to a power grid. Charging stations may also be part of a charging control network, and thus are managed, e.g., via a control system that may monitor operation or utilization of the charging stations and/or the power grid, set charging characteristics for the charging stations, monitor the hardware or software status of the charging station, or perform other system management tasks.

However, some conventional management techniques may not adapted for delegating different management tasks to different systems and/or entities. For example, it may be impractical for one entity to monitor the operation and utilization of the charging stations while having another entity setting charging characteristics for the charging stations because a conventional management system only provides a single point of access to the network. Moreover, a conventional management system may raise the barrier of entry for updating or replacing hardware and software for the charging stations and/or management system. For example, parity generally needs to be maintained between software and hardware, and thus any updates must typically occur network-wide rather than granularly, which may be significantly more costly and complex.

The present disclosure is directed to overcoming one or more of these above-referenced challenges. The scope of the current disclosure, however, is defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods, systems, and non-transitory computer-readable media are disclosed for controlling and/or managing electric vehicle supply equipment (EVSE). Each of the examples disclosed herein may include one or more of the features described in connection with any of the other disclosed examples.

In one example, an exemplary embodiment of a mediator system for a control system of a charging control network may include a processor, and a memory operatively connected to the processor. The memory may store instructions executable by the processor to perform acts that include maintaining a virtualized connection between an Electric Vehicle Supply Equipment ("EVSE") in the charging control network and a plurality of server systems in the charging network by: in response to receiving a first request from the EVSE, selectively routing the first request to one or more server systems from amongst the plurality of server systems; in response to receiving at least one first reply to the first request from the selected one or more server systems, selectively routing one and only one of the at least one first reply to the EVSE; in response to receiving a second request from one of the plurality of server systems, the second request directed toward the EVSE, routing the second request to the EVSE; and in response to receiving a second reply to the second request from the EVSE, routing the second reply to the one of the plurality of server systems that transmitted the second request.

In some embodiments, the acts further include: receiving a first connection from the EVSE; and in response to receiving the first connection request: establishing a respective second connection with each server system in the plurality of server systems; and forming the virtualized connection between the EVSE and the plurality of server systems based on the first connection and the respective second connections.

In some embodiments, a first communications protocol for at least one of the first connection or one of the respective second connections is different from a second communications protocol of another.

In some embodiments, one or more of: the first communications protocol is a stateless communications protocol, and the second communications protocol is a stateful communications protocol; or the first communications protocol is a first version of a communications protocol, and the second communications protocol is a second version of the communications protocol that is different than the first version.

In some embodiments, the first connection enables communications using a first communication protocol and communications using a second communications protocol different from the first communications protocol.

In some embodiments, the acts further include: in response to one of the first connection or one of the respective second connections being interrupted, attempting to re-establish said interrupted connection; and in response to a failure to re-establish said interrupted connection, terminating a remainder of the one of the first connection and one of the respective second connections.

In some embodiments, the acts further include: caching at least one request or reply that would otherwise be routed via said interrupted connection; and in response to said interrupted connection being re-established, routing the at least one cached request or reply via the re-established connection.

In some embodiments, the acts further include, in response to one of the respective second connections being interrupted: attempting to re-establish said interrupted connection; caching at least one request or reply that would otherwise be routed via said interrupted connection; and in response to said interrupted connection being re-established, routing the at least one cached request or reply via the re-established connection.

In some embodiments, the acts further include, in response to the first connection being interrupted, terminating the respective second connections.

In some embodiments, the selectively routing of the first request to the one or more server systems from amongst the plurality of server systems includes: applying a predetermined set of rules to the first request to identify the one or more server systems as relevant to the first request; and routing the first request to the identified one or more server systems.

In some embodiments, applying the predetermined set of rules includes: based on the predetermined set of rules, determining a category of the first request; and comparing the determined category of the first request with predetermined categories of the plurality of server systems, and identifying the one or more server systems as having a predetermined category that matches the category of the first request.

In some embodiments, one of the server systems from amongst the plurality of server systems is assigned as a primary server system to the EVSE, and in response to one of the at least one first replies originating from the primary server system assigned to the EVSE, the one and only one of the at least one of the first reply that is routed to the EVSE is the first reply originating from the primary server system assigned to the EVSE.

In some embodiments, at least one of the server systems from amongst the plurality of server systems other than the primary server system is assigned as at least one secondary server system to the EVSE, the virtualized connection enables the primary server system to apply at least one control process to the EVSE, and the virtualized connection enables the at least one secondary server system to apply at least one monitoring process to the EVSE.

In another example, an exemplary embodiment of a computer-implemented method may include maintaining a virtualized connection between an Electric Vehicle Supply Equipment ("EVSE") in a charging control network and a plurality of server systems in the charging network by: in response to receiving a first request from the EVSE, selectively routing the first request to one or more server systems from amongst the plurality of server systems; in response to receiving at least one first reply to the first request from the selected one or more server systems, selectively routing one and only one of the at least one first reply to the EVSE; in response to receiving a second request from one of the plurality of server systems, the second request directed toward the EVSE, routing the second request to the EVSE; and in response to receiving a second reply to the second request from the EVSE, routing the second reply to the one of the plurality of server systems that transmitted the second request.

In some embodiments, the method further includes: receiving a first connection from the EVSE; and in response to receiving the first connection request: establishing a respective second connection with each server system in the plurality of server systems; and forming the virtualized connection between the EVSE and the plurality of server systems based on the first connection and the respective second connections.

In some embodiments, a first communications protocol for at least one of the first connection or one of the respective second connections is different from a second communications protocol of another, and one or more of: the first communications protocol is a stateless communications protocol, and the second communications protocol is a stateful communications protocol; or the first communications protocol is a first version of a communications protocol, and the second communications protocol is a second version of the communications protocol that is different than the first version.

In some embodiments, the first connection enables communications using a first communication protocol and communications using a second communications protocol different from the first communications protocol.

In some embodiments, the method further includes: in response to one of the first connection or one of the respective second connections being interrupted: caching at least one request or reply that would otherwise be routed via said interrupted connection; and attempting to re-establish said interrupted connection; in response to said interrupted connection being re-established, routing the at least one cached request or reply via the re-established connection; and in response to a failure to re-establish said interrupted connection, terminating a remainder of the one of the first connection and one of the respective second connections.

In some embodiments, the selectively routing of the first request to the one or more server systems from amongst the plurality of server systems includes: applying a predetermined set of rules to the first request to identify the one or more server systems as relevant to the first request; and routing the first request to the identified one or more server systems.

In some embodiments, applying the predetermined set of rules includes: based on the predetermined set of rules, determining a category of the first request; and comparing the determined category of the first request with predetermined categories of the plurality of server systems, and identifying the one or more server systems as having a predetermined category that matches the category of the first request.

In some embodiments, one of the server systems from amongst the plurality of server systems is assigned as a primary server system to the EVSE, in response to one of the at least one first replies originating from the primary server system assigned to the EVSE, the one and only one of the at least one of the first reply that is routed to the EVSE is the first reply originating from the primary server system assigned to the EVSE, at least one of the server systems from amongst the plurality of server systems other than the primary server system is assigned as at least one secondary server system to the EVSE, the virtualized connection enables the primary server system to apply at least one control process to the EVSE, and the virtualized connection enables the at least one secondary server system to apply at least one monitoring process to the EVSE.

In a further example, an exemplary embodiment of a control system for a charging control may include: a primary server system configured to apply at least one control process to an Electric Vehicle Supply Equipment ("EVSE") in the charging control network; at least one secondary server system configured to apply at least one monitoring process to the EVSE; and a mediator system configured to maintain a virtualized connection between the EVSE and both of the primary server system and the at least one secondary server system. The mediator system may include a processor and a memory operatively connected to the processor. The memory may store instructions executable by the processor to perform acts that include: in response to receiving a first request from the EVSE, selectively routing the first request to one or more of the primary server system or the at least one secondary server systems based on a set of predetermined rules; in response to receiving at least one first reply to the first request from the selected one or more of the primary server system or the at least one secondary server systems, selectively routing one and only one of the at least one first reply to the EVSE; in response to receiving a second request from one of the primary server system or one of the at least one secondary server systems, the second request directed toward the EVSE, routing the second request to the EVSE; and in response to receiving a second reply to the second request from the EVSE, routing the second reply to the one of the primary server system or one of the at least one secondary server systems that transmitted the second request.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that The disclosed systems and methods discussed below may allow for multi-server control of an EVSE, and for a control system that is tolerant to different communications protocols and/or different versions of communications protocols for different devices.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 is a flow diagram depicting an exemplary embodiment of a method for maintaining the virtualized connection of FIG. 3.

DETAILED DESCRIPTION OF EMBODIMENTS

Figure 1:
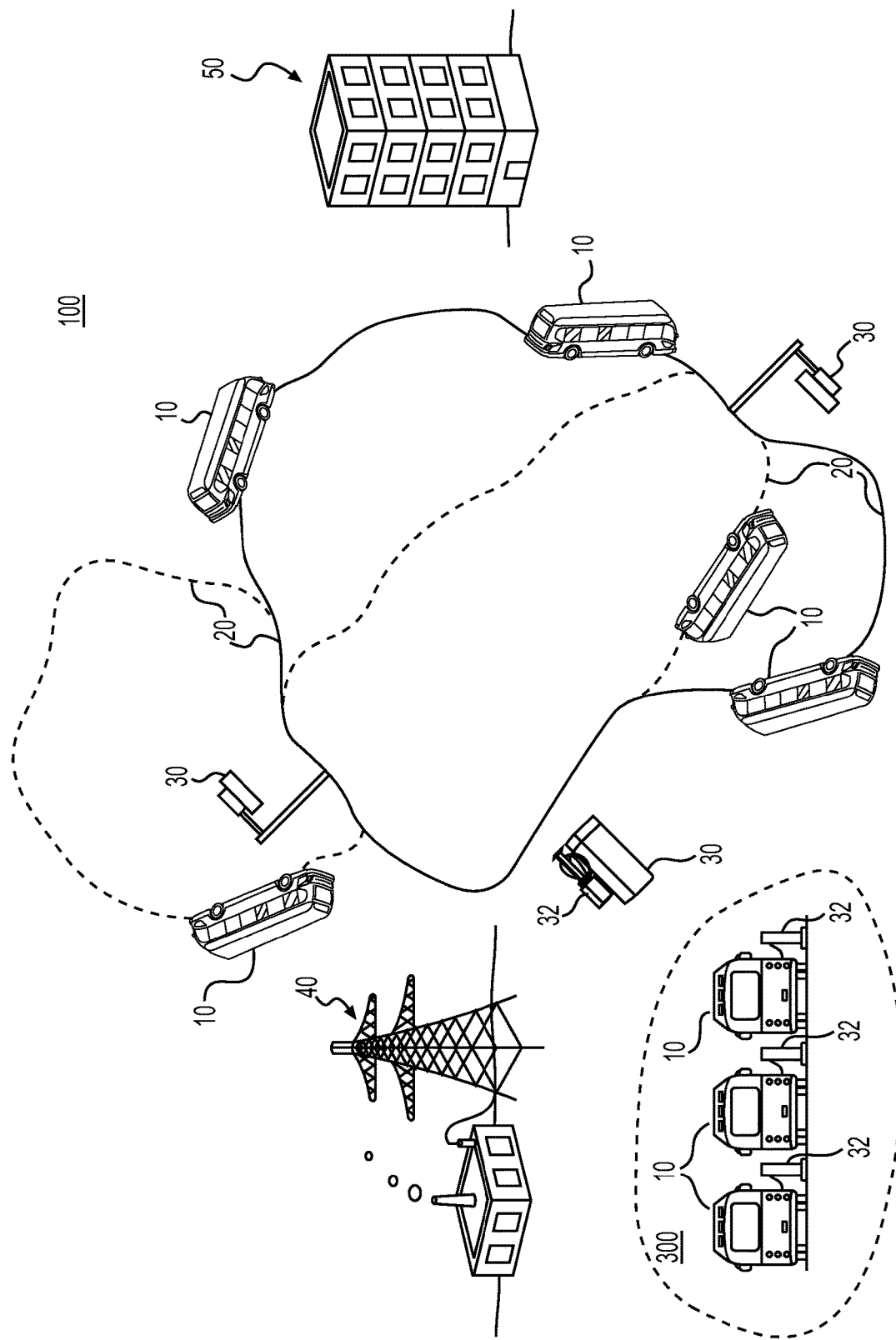
FIG. 1 depicts a schematic illustration of an exemplary embodiment of a fleet of electric buses operating in a charging control network within in a geographic area.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system. As used herein, a "server" or "server system" generally encompasses any electronic computational device such as, for example a computer system. While certain embodiments below may discuss a server system as performing a particular act or acts, it should be understood that such acts are not exclusively performed by server systems, and that server systems may perform other or additional acts.

As used herein, a "network" generally encompasses a wide area network ("WAN"), a local area network ("LAN"), personal area network ("PAN"), or the like. In some embodiments, the network includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In this disclosure, the term "charging control network" generally encompasses a network of devices for charging electric vehicles.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

Conventional techniques for managing Electric Vehicle Supply Equipment ("EVSE"), i.e. electric vehicle charging stations or the like, typically include forming a charging control network between one or more electric vehicles, one or more EVSEs, and a central control server. More particularly, conventional control systems for charging control networks generally utilize communications protocols that are only configured to operate with a single control system server. With only a single control server, such conventional charging control networks only provide a single point of access to the network, and thus are not adapted for delegating different management tasks to different systems and/or entities.

Moreover, conventional EVSE management techniques generally require that all devices in a charging control network are operating on not only a same communications protocol, but a same version of the communication protocol. In other words, in a conventional charging control network, devices with different types or versions of communication protocol may be unable to communicate, and thus any updates or changes must generally be applied network-wide.

As a result, conventional EVSE management techniques result in conflicts when, for example, different entities desire to use different software or communications protocols to perform different tasks like monitoring charging station data or remotely controlling charging station operation or charging characteristics. Conventional EVSE management technique may thus also result in a barrier to entry for adoption of new devices and/or features due to compatibility gaps between devices to be included in the network.

Accordingly, a need exists for a control system for a charging control network that enables delegation of management tasks to separate systems and/or entities. A need also exists for a control system that is resilient to different communication protocols and protocol versions. One or more features of the following embodiments are directed to overcoming one or more of these above-referenced challenges.

FIG. 1 is a schematic illustration of a fleet of electric buses 10 operating along several routes 20 in a geographic area 100. Geographic area 100 may include any area (airport, university campus, city, town, county, etc.) that can be serviced by a fleet of electric buses 10. The fleet may include any number of electric buses 10. The fleet of buses 10 may be operated by an authority 50 (transport authority, airport authority, metro authority, etc.). In some cases, one or more charging stations 30 may be positioned along the different routes 20 to charge the buses 10 that operate on these routes 20. The charging stations 30 may be coupled to an electric grid that is supplied with energy (electricity) by a utility company 40 that services the geographic area 100. When a bus 10 pulls up to a charging station 30, an interconnection mechanism of the charging station 30 (e.g., a pantograph, catenary, etc.) couples with charging electrodes of the bus 10 to charge the batteries of the bus 10. After charging the batteries to a desired level, the bus 10 decouples from the interconnection mechanism and proceeds along its route 20. When the charge of the bus 10 decreases below a predetermined value, the bus 10 pulls into the same or a different charging station 30 to get recharged. The charging stations 30 may be positioned such that they service the buses 10 operating on several different routes 20.

Electric bus 10 may include a charging interface that couples with the interconnection mechanism of the charging station 30 to transfer electric power to the batteries. Without limitation, the bus 10 may include any type of charging interface that is adapted to couple with the interconnection mechanism. In some embodiments, the charging interface may be provided on the roof or another external surface of the bus 10. As the bus 10 stops at the charging station 30, the interconnection mechanism may advance towards (in some embodiments, swing over and descend towards) and couple with the charging interface on the roof to charge the bus 10. Some possible embodiments of charging interfaces and charging stations 30 are described in commonly-assigned patents/applications: U.S. Pat. No. 8,324,858; and International Application Publication Nos. WO/2011/079215, WO/2011/079215, and WO/2011/139680 which are incorporated by reference in their entirety herein.

It should be noted that the charging arrangement described above (e.g., multiple charging stations with pantograph-type interconnection mechanisms positioned along a route, etc.) is only exemplary, and the current disclosure is broadly applicable to any type of charging arrangement. For example, in some applications, the buses may include one or more charge ports (e.g., SAE J1772 charge port, ChadeMo charge port, etc.) positioned on the bus (e.g., on a side surface), and these buses may be charged in a depot 300 or a yard (see FIG. 1). The depot 300 may include multiple charging stations 30 and/or multiple charge dispensers 32 coupled to the charging stations 30. To recharge the batteries, a bus 10 may pull into the depot, plug a connector (e.g., SAE J1772 connector) that is electrically coupled to a charge dispenser 32 into one of its charge ports, and begin charging. In some embodiments, multiple buses 10 may be plugged into different dispensers 32 of a depot 300 and charged simultaneously (e.g., at night, scheduled down times, etc.). Details of exemplary charging arrangements of this type are described in commonly assigned U.S. Pat. No. 9,669,719 and PCT Application Publication No. WO2019071154 A1, each of which is incorporated by reference in their entirety herein.

Figure 2A:
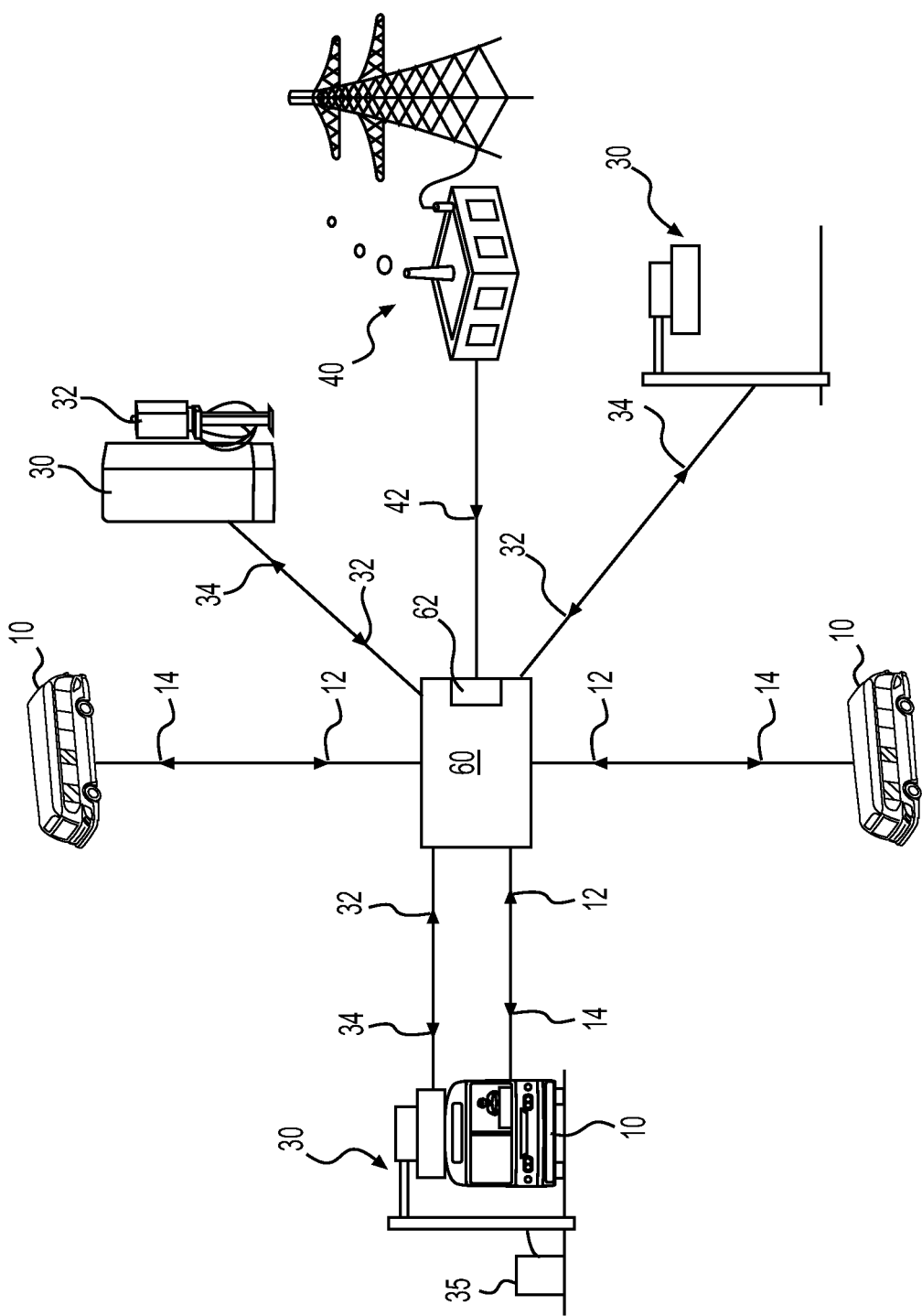
FIG. 2A depicts a schematic illustration of an exemplary embodiment of a charging control network that includes a control system usable to control the fleet of electric busses of FIG. 1

Irrespective of the type of charging arrangement of the buses 10, authority 50 may operate a control system that controls the charging of the buses 10. FIG. 2A schematically illustrates an exemplary embodiment of a charging control network 120 that includes a control system 60 usable to control the fleet of electric buses 10 of FIG. 1, e.g., the charging stations 30, and the electric buses 10 operating in geographic area 100. The control system 60 may be positioned at any location (or multiple locations) and include one or more computer systems (or connected electronic devices) networked together over a wired or wireless network. In some embodiments, control system 60 may reside in one or more computer servers in the offices of the authority 50. In some embodiments, the control system 60 may be located at a charging station 30 or at another remote site. The control system 60 may be configured to receive data from, among others, the buses 10, charging stations 30, the utility company 40, and the authority 50. The control system 60 may also be configured to store data, perform computations, and relay data and/or instructions to the buses 10 and the charging stations 30. The control system 60 may be configured to receive data wirelessly and/or over a wired network. The control system 60 may also include input devices (such as, for example, key boards, disk/CD/DVD readers, memory card readers, etc.) configured to input data into the control system 60, and output devices (display devices, printers, disk/CD/DVD/memory card writers) configured to output data and information. The control system 60 may also be configured to store data 62 and other information, and perform computations on the stored and received data.

The control system 60 may receive data from and send instructions to the buses 10 and/or the charging stations 30 in geographic area 100. In some embodiments, each electric bus 10 operating in the geographic area 100 may transmit data to the control system 60. And, in some embodiments, each charging station 30 in the geographic area 100 may transmit data 32 to the control system 60. A bus 10 may send data to the control system 60 wirelessly or through a wired connection. In some embodiments, a bus 10 may wirelessly transmit data periodically. In some embodiments, the bus 10 may transmit to and/or receive data from the control system 60 when it docks with a charging station 30. The data transmitted by a bus 10 may include, among others, identifying information of the bus 10 and driver, current state of charge (SOC) of the bus 10, the route 20 of the bus 10, the state of auxiliary charging unit (if any) on the bus 10, and the current location of the bus 10. The SOC of the bus 10 may indicate the available charge (50% of full charge, etc.) on the bus 10 at any particular time. In some embodiments, based on this data and stored data, the control system 60 may estimate the SOC of the bus 10 when it reaches the next charging station 30 along its route (or the depot). Data may also include the current operating parameters (such as, speed, load, etc.) of the bus 10. Based on the operating parameter data, the control system 60 may determine the rate of energy consumption of the bus 10 to get a better estimate of the SOC when the bus 10 reaches the next charging station 30 (or the depot).

The data transmitted from the charging stations 30 may include details of charging of a bus 10. These details may include, for example, identification of the bus 10 that is being charged, the time of charging, amount of power transferred to the bus 10, amount of time it took to transfer the power, rate of charging, etc. In some embodiments, one or more charging station 30 along a route or in depot may include an energy storage device 35 (e.g., a bank of batteries, etc.) that may be used to charge the bus, for example, during times of high energy cost (e.g., during peak hours, etc.). The energy storage device 35 may be charged during periods of low energy cost. In some embodiments, data from charging stations 30 may also include information concerning the energy storage device 35, such as, the state of charge of the energy storage device 35. In some embodiments, the data may be transmitted real time, while in other embodiments, the data may be transmitted only periodically. The control system 60 may also transmit instructions to the charging stations 30. These instructions may include the amount of energy to transfer to a bus 10, and the rate of energy transfer.

In some embodiments, the data transmitted and received by the control system 60 follows a communications protocol, i.e. a predetermined syntax and/or library of requests and corresponding responses. For example, Open Charge Point Protocol (OCPP) and the Open Smart Charging Protocol (OSCP) are protocols promoted by a global consortium of public and private electric vehicle infrastructure leaders. Version 2.0 of the OCCP contains a library of requests and responses for various functionalities. Several examples of functionalities in the OCCP library are discussed below, but it should be understood that different protocols may include different functionalities and/or different syntaxes. It should be noted that the specific protocols discussed above are only exemplary. Any acceptable communications protocol or combination of communications protocols may be used with the current disclosure.

In a "provisioning" block, the OCCP library includes functionalities related to booting, configuration, and resetting of a charging station. An "authorization" block of the OCCP library includes functionalities related to authorizing a user, verifying authorization for starting and stopping charging, etc. A "transaction block includes functionalities related to starting and stopping transactions, and transaction error-handling. An "availability" block includes functionalities related to status of charging stations, and whether a charging station is accepting electric vehicles for charging. A "metering" block includes functionalities relating to monitoring of meter values of charging stations.

Figure 2B:
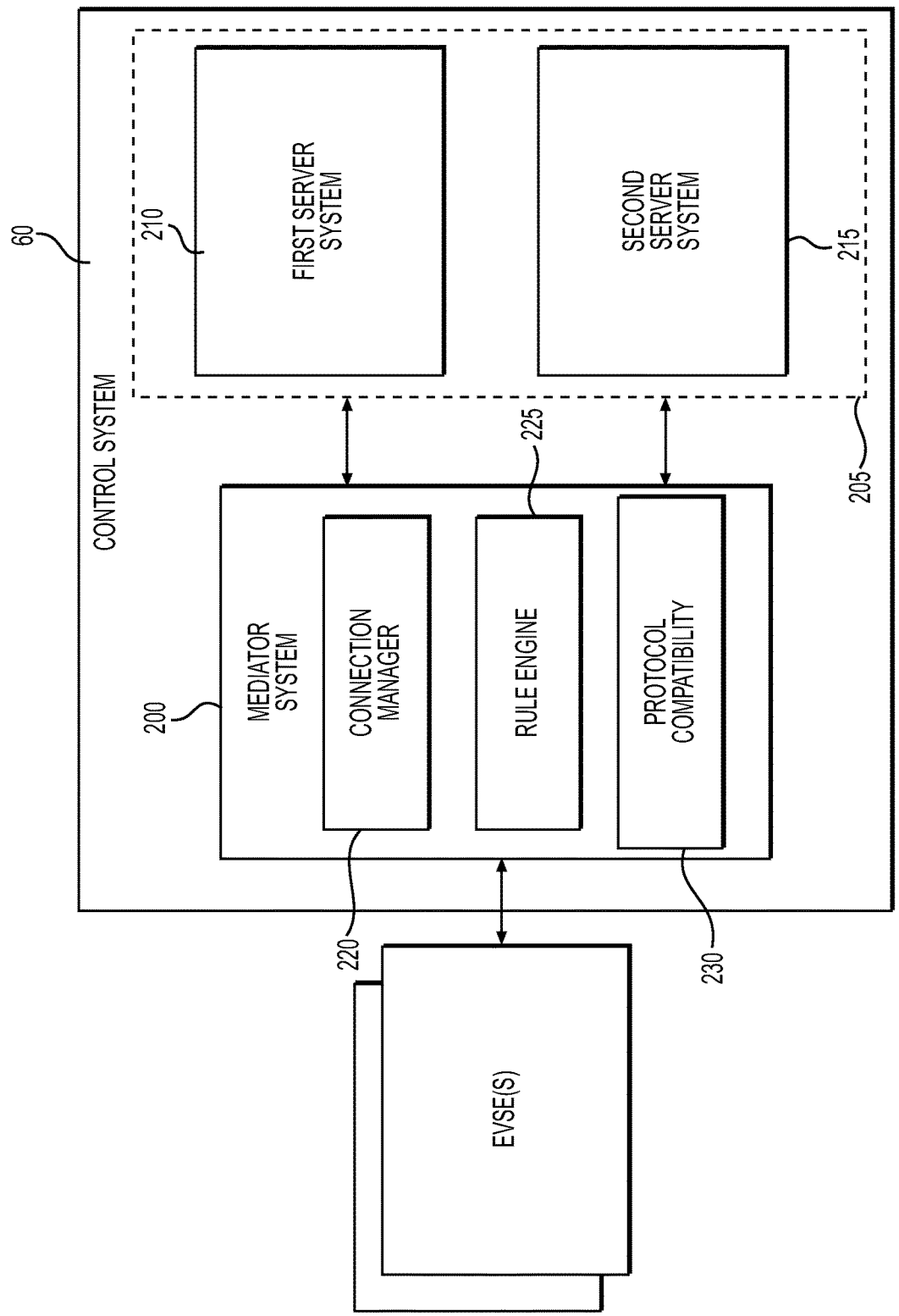
FIG. 2B depicts a functional block diagram of an exemplary client-server environment that may be utilized according to aspects of the present disclosure for a control system of the charging control network of FIG. 2A.

Any suitable system infrastructure may be put into place to implement the control system 60. FIG. 2B and the following discussion provide a brief, general description of an exemplary suitable computing environment in which the control system 60 of the present disclosure may be implemented.

In various embodiments, any of the disclosed systems and/or methods, may be executed by or implemented by a computing system or systems consistent with or similar to the control system 60 depicted in FIG. 2B. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the control system 60 may be embodied in a special purpose computer and/or data processor that is specifically programmed, configured, and/or constructed to perform one or more of the computer-executable instructions explained in detail herein. While aspects of the control system 60 are described as being practiced in a distributed manner where functions or modules are shared or distributed among disparate processing devices, the present disclosure may also be practiced via aspects performed exclusively on a single device, e.g. via device virtualization or other techniques. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As shown in FIG. 2B, the control system 60 may include a mediator system 200 or a multiplexer, and a plurality of server systems 205. In this embodiment, the control system 60 includes a first server system 210, and a second server system 215, but other embodiments may include any number of server systems. As used herein, the terms "mediator" and "multiplexer" generally encompasses any electronic computational device such as, for example a computer system. Moreover, while certain embodiments below may discuss a mediator or multiplexer system as performing a particular act or acts, it should be understood that such acts are not exclusively performed by such systems, and that such systems may perform other or additional acts.

While depicted in FIG. 2B as separate systems, it should be understood that at least a portion of one or more of the mediator system 200, the first server system 210, the second server system 215, etc. may be incorporated into another system and/or implemented as virtual machines, distributed computing devices, or any acceptable computing architecture. In FIG. 2B, the control system is depicted as in communication with an Electric Vehicle Supply Equipment ("EVSE"), e.g., a charging station 30 and/or a charging apparatus onboard an electric bus 10. It should be understood that, in various embodiments, any number of EVSEs may be in communication with the control system 60. Although not depicted in FIG. 2B, in various embodiments, the control system 60 may also be in communication with other systems such as, for example, the power grid 40, an electric bus 10, a system associated with an entity or organization desiring to monitor and/or control the charging control network, etc.

In FIG. 2B, various systems are depicted as having functional blocks or modules that may perform various acts. However, it should be understood that such depiction is illustrative, and that this disclosure is not limited to systems with discrete functional blocks or modules, and that in various embodiments, acts described below as being performed by a particular module may be performed by another module or may be unassociated with a particular module. Moreover, in various embodiments, the control system 60 may include fewer or additional modules and/or functionalities. Further, lines depicting communications in FIG. 2B are illustrative examples, and it should be understood that various systems and modules in FIG. 2B may communicate with various other systems and modules in any acceptable configuration. In some embodiments, various systems and modules in FIG. 2B communicate with various other systems and modules directly, or via an electronic network such as the Internet.

In the embodiment depicted in FIG. 2B, the mediator system 200 includes a connection manager module 220, a rule engine module 225, and a protocol compatibility module 230. The connection manager module 220 may be configured to manage a virtualized connection between a charging station 30 and the plurality of server system 205, and to establish, manage, monitor, maintain, and close individual connections between the mediator system 200 and other systems and devices in the charging control network. The rule engine module 225 may be configured to manage, maintain, and apply a predetermined set of rules to transmissions exchanged between the mediator system 200 and devices in the charging control network. The protocol compatibility module 230 may be configured to manage compatibility between communications protocols of transmissions sent and received by the mediator system 200. Additional aspects of the foregoing functionalities is discussed in further detail below.

In some embodiments, various functionalities for the charging control network may be grouped together, e.g. into the blocks discussed above for the OCCP, or into other groupings or categories. In some embodiments, a particular server system in the plurality of server systems 205 may be associated with a particular group or category of functionalities in the charging control network. For instance, in some embodiments, the first server system 210 may be associated with functionalities related to controlling operations of the charging stations 30, and the second server system 215 may be associated with monitoring various aspects of the charging stations. In some embodiments, the mediator system 200 may assign a particular server system with one or more functionalities or groups of functionalities.

In another exemplary embodiment, the plurality of server systems 205 are associated with different functionalities and/or entities associated with administrating such functionalities. The plurality of server systems 205 in this exemplary embodiment include a first server system associated with functionalities for monitoring a charging session of the EVSE by a first entity, a second server system associated with functionalities for charging characteristics of the EVSE by a second entity, a third server system associated with functionalities for user authentication and payment transaction service for the EVSE by a third entity, and a fourth server system associated with functionalities for power consumption monitoring and control by a fourth entity. Other embodiments may include any acceptable grouping of functionalities and/or entities amongst any number of server systems.

In some embodiments, functionalities for the plurality of server systems 205 may be predetermined. For example, in some embodiments, different server systems in the plurality of server systems 205 may be associated with different entities or organizations associated with different aspects of the control of the charging control network. In an exemplary embodiment, a first entity may be associated with installing the charging control network and with functionalities related to hardware and software monitoring and maintenance, a second entity may be associated with monitoring usage characteristics of the charging stations 30 and/or the power grid 40, and a third entity may be associated with controlling charging characteristics and/or route characteristics of the electric busses 10, whereby each entity may be associated with and has independent access and/or control of a respective one of the plurality of server systems. In some embodiments, a particular server system may communicate with an associated entity independently of the mediator system 200. In some embodiments, the particular server system may communicate with the associated entity via the mediator system 200.

Various functionalities may be associated with various transmissions between a respective server system and a charging station 30 or electric bus 10. In some embodiments, transmissions associated with different server systems may overlap or conflict. As discussed in further detail below, the mediator system 200, e.g., via the rule engine module 225, may be configured to mediate between conflicting and/or overlapping transmissions. Any acceptable criteria for the predetermined set of rules may be used. For example, in some embodiments, for conflicting transmissions that are associated with a particular functionality, the mediator system 200 may be configured to prioritize a particular transmission originating from a server system associated with that functionality.

In some embodiments, the criteria for the predetermined set of rules is received via manual entry from a user. In some embodiments, the criteria is usable to establish, define, and/or manage a virtualized connection between two systems in the charging control network, e.g., via defining rules that govern how communications between the two systems are routed so as to maintain the virtualized connection. Further aspects of such a virtualized connection are discussed in further detail below. In some embodiments, the criteria is usable to determine a respective destination server system for transmissions received by the mediator system 200 from the EVSE. In some embodiments, the criteria is usable to determine whether a transmission from a server system is to be routed to the EVSE. In some embodiments, the criteria is usable to edit and/or adjust a transmission in order to maintain a compatibility between a sender and a recipient of the transmission.

In some embodiments, the plurality of server systems 205 may have a priority ranking for each server, and the mediator system 200 may mediate a conflict between transmissions based on the priority rankings. For instance, in some embodiments, the first server system 210 in the plurality of server systems 205 may be designated as a primary server system, and the remaining server system(s), e.g., the second server system 215, may be designated as a secondary server system(s). In some embodiments, the plurality of server systems 205 may include a primary server system, a secondary server system, a tertiary server system, and etc. In some embodiments, the mediator system 200 may be configured to resolve overlapping and/or conflicting transmissions based on the rank of the servers associated with the overlapping and/or conflicting messages.

In some embodiments, the rank(s) of the plurality of server system 205 may be predetermined, e.g., via settings received from a user. In some embodiments, the rank(s) of the plurality of server system 205 may be determined via the mediator system 200, e.g., via the rule engine module 225. For instance, in some embodiments, each charging station 30 may be assigned a respective server system as a primary server system. In some embodiments, assignment of rank to server systems may be determined based on operating parameters such as system load, communications traffic, charging station 30 utilization, or other factors.

In some embodiments, the functionality associated with a particular server system may be associated with the rank of that server system. For example, the first server system 210 may be a primary server system for the charging station 30, and may include, for example, a charging control module configured to set charging characteristics of an EVSE, e.g., the charging station 30, and to control starting and stopping of charging at the charging station 30, for example. The second server system 215 may be a secondary server system, and may be configured to one or more of monitor the charging of an electric bus 10 via the charging station 30, monitor energy use parameters associated with the power grid 40 and/or the charging station 30, or monitor status parameters of the charging station 30, for example. In other embodiments, server systems may be associated with one or more groupings of functionalities and/or entities, as discussed above. For example, in an exemplary embodiment, various server systems are associated with one or more of monitoring or controlling various aspects of the electric bus 10, monitoring or facilitating various aspects of a transaction associated with charging the electric bus 10, or other functionalities or groupings of functionalities. Any acceptable grouping of functionalities amongst any number of server systems may be used.

As discussed in further detail below, the mediator system 200 may mediate between an EVSE, such as the charging station 30, and the plurality of servers 205. Transmissions managed by the mediator system 200 may be bi-directional. In other words, the mediator system 200 may manage not only a request sent by one system or device, but also a reply to such request.

In some embodiments, connections between the mediator system 200 and various systems or devices in the charging control network may utilize different communications protocols or different versions of communications protocols, whereby the mediator system, e.g., via the protocol compatibility module 230, mediates between the various protocols or protocol versions so that transmissions routed to a particular device or system are compatible with that device or system. Moreover, such mediation may be independent of the communication(s) protocol used by the systems or devices in the charging control network, such that the control system 60 may utilize the plurality of server systems 205 in conjunction with a communication protocol configured for only single server control.

Figure 3:
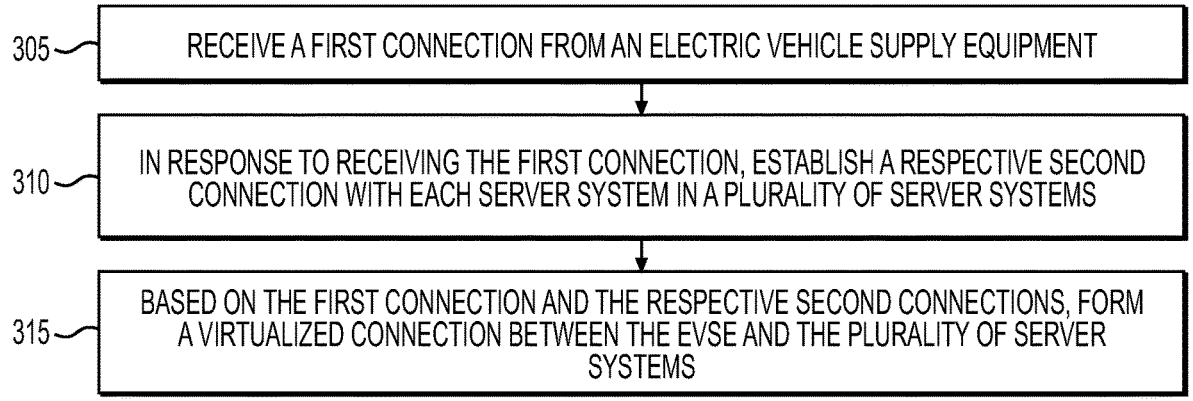
FIG. 3 is a flow diagram depicting an exemplary embodiment of a method for forming a virtualized connection between Electric Vehicle Supply Equipment ("EVSE") and server systems within the control system of FIG. 2B.

FIG. 3 depicts an exemplary embodiment of a method for forming a virtualized connection between an EVSE and the plurality of servers 205. At step 305, the mediator system 200 may receive a first connection from the EVSE. At step 310, in response to receiving the first connection, the mediator system 200 may establish a respective second connection with each server system in the plurality of server system 205, e.g., a respective second connection with each of the first server system 210 and the second server system 215.

In some embodiments, the first connection from the EVSE may include a transmission, and thus in some embodiments, the mediator system 200 may be configured to cache such transmission until the respective second connections are established, and then selectively route the transmission to one or more of the plurality of server systems 205, e.g., based on the rule engine module 225. In some embodiments, the EVSE may send one or more transmissions after the first connection is established, but prior to the respective second connections being established, whereby such transmissions may also be cached by the mediator system 200 in the manner discussed above.

At step 315, based on the first connection with the EVSE and the respective second connections with the plurality of servers 205, the mediator system 200 may form a virtualized connection between the EVSE and the plurality of server systems 205. As used herein, a "virtualized connection" generally encompasses a connection between two devices via the mediator system 200 in which the route, origin, and/or destination of a transmission may be transparent to the sender and/or receiver of the transmission. For example, the EVSE, rather than routing a request to a particular server system, may instead transmit the request via the first connection, whereby the mediator system, e.g., via the rule engine system 225, may route the request to a particular server system via the corresponding respective second connection. In another example, the EVSE may be able to transmit a reply to a request without determining the origin of the request, and the mediator 200 may route the reply to the origin of the request and/or another device, ad discussed in further detail below. In an exemplary embodiment in which the first server system 210 is designated as the primary server system and the second server system 215 is designated as the secondary server system, the virtualized connection between the EVSE and the plurality of server systems 205 enables the primary server system to apply at least one control process to the EVSE, and enables the secondary server system to apply at least one monitoring process to the EVSE.

In some embodiments, connections between the mediator system 200 and various systems and devices may utilize different communications protocols. As noted above, conventional communications protocols for a charging control network only support a single protocol at a time, and moreover require that each system and device is operating using a same version of such protocol. For example, the OCCP requires that all systems and devices in a network are operating using a same version of the OCCP. And, while the OCCP is configured to operate with a stateful protocol such as a web-socket connection or a stateless protocol such as REST, OCCP is not able to operate using both on a single network. However, in a charging control network, and in particular a charging control network with different systems or devices that may have different versions of software or may be associated with different entities, it may be beneficial for the control system 60 to be tolerant to differences in communications protocols between devices.

For example, in some embodiments, the first connection between the EVSE and the mediator system 200 may utilize a first communications protocol, and at least one of the respective second connections with at least one of the server systems in the plurality of server systems utilizes a second communications protocol different than the first communications protocol. In some embodiments, the first communications protocol may be a stateless communications protocol, and the second communications protocol may be a stateful communications protocol, or vice versa. In some embodiments, the first communications protocol may be a first version of a communications protocol, and the second communications protocol may be a second version of the communications protocol that is different than the first version.

It should be understood that different protocols may include different functionalities, syntax, and/or information. For example, consider an embodiment in which one system in the charging control network may be utilizing a stateless protocol, such as REST, and another system may be using a stateful protocol, such as a web-socket connection. For a stateless protocol like REST, each transmission generally includes all information necessary to respond to the transmission, and thus a recipient generally does not need to maintain or store information regarding the current state of a sender. However, a stateful protocol, such as a web-socket connection, generally does not include such information. Thus, in some embodiments, the mediator system 200, e.g., via the protocol compatibility module 230, may be configured to mediate between the stateless connection and the stateful connection. For example, in some embodiments, the mediator system 200 may store information regarding the state of the system operating using a stateless communication protocol, and use such information to supplement a transmission routed to the system utilizing a stateful communication protocol.

In another example, one system in the charging control network may be using a first version of a communication protocol such as version 1.6 of the OCCP, and another system may be using a second version of the communication protocol such as version 2.0 of the OCCP, whereby different versions of the communication protocol have different functionalities and syntax. Thus, in some embodiments, the mediator system 200, e.g., via the protocol compatibility module 230 and/or the rule engine 225, may be configured to mediate between the different versions of the communications protocols. For example, in some embodiments, the mediator system 200 may adapt the syntax of a transmission originating from one system from a first communications protocol into the syntax of a second communications protocol utilized by the recipient of the transmission.

In some embodiments, the mediator system 200 may be configured to determine that a functionality available via a communication protocol utilized by a first device in the charging network is not available via a communication protocol utilized by a second device in the charging network. In some embodiments, in response to receiving a request pertaining to that functionality from the first device directed toward the second device, the mediator system 200 may be configured to reject the request and/or not forward the request to the second device. In some embodiments, the mediator system 200 may be configured to adapt at least a portion of the request into a request for a functionality available to the second device. In some embodiments, the mediator system 200 may be configured to adjust the request toward being more compatible with the second device, and/or is configured to adjust a response from the second device toward being more aligned with an expected response to the request.

For example, the first server system 210 may request a periodic monitoring of the charging rate of an EVSE, but the EVSE may be utilizing a protocol in which periodic monitoring is unavailable. In some embodiments, the mediator system 200 may reject the request. In some embodiments, the mediator system 200 may transmit single instance monitoring requests at regular intervals in order to approximate the functionality requested by the first server system 210.

In another example, the mediator system 200 may receive a transmission from a first device using a first version of a communications protocol, whereby the transmission has a recipient of a second device using a second version of the communication protocol that is different from the first. The mediator system 200 may, in some embodiments, parse information from the transmission received from the first device, and generate a further transmission (e.g., based on the parsed information, the rule engine 225, and/or the protocol compatibility module 230) that is compatible with the second version of the communications protocol. In an exemplary use case, the mediator system 200 may receive a transmission from an EVSE using version 1.6 of the OCCP that includes a notification that the EVSE has booted up (e.g., turned on, activated, or the like). Such a transmission may be represented by the following exemplary pseudo-code:

```
BootNotification Message for 1.6
[
  2,
  "UniqueID",
  "BootNotification",
  {
    "chargePointVendor": "sample_chargePointVendor",
    "chargePointModel": "sample_chargePointModel",
    "chargeBoxSerialNumber": "sample_chargeBoxSerialNumber",
    "chargePointSerialNumber": "sample_chargePointSerialNumber",
    "firmwareVersion": "sample_firmwareVersion",
    "iccid": "sample_iccid",
    "imsi": "sample_imsi"
  }
]
```

It should be understood that pseudocode, such as the above, is exemplary only, and that transmissions may have a variety of forms, syntax, etc. The mediator system 200 may determine that such transmission is to be received by a server system using version 2.0 of the OCCP. The mediator system 200 may parse information from such transmission (e.g., the UniqueID, the name of the chargePointVendor, etc.), and may generate a further transmission that is compatible with version 2.0 of the OCCP. The further transmission may be represented by the following exemplary pseudocode:

```
BootNotification Message for 2.0
[
   2,
   "UniqueID",
   "BootNotification",
   {
      "reason":"PowerUp",
      "chargingStation":{
         "serialNumber":"sample_chargeBoxSerialNumber",
         "model":"sample_chargePointModel",
         "vendorName":"sample_chargePointVendor",
         "firmwareVersion":"sample_firmwareVersion",
         "modem":{
            "iccid":"sample_iccid",
            "imsi":"sample_imsi"
         }
      }
   }
]
```

It should be understood that the differences between the transmission using version 1.6 of the OCCP and version 2.0 of the OCCP are exemplary only, and that the further transmission generated by the mediator system 200 may include, for example, additional information, less information, and/or edited information such as changed variable names, formatting, syntax, etc.

In some embodiments, another system in addition to the mediator system 200 may be configured to communicate using more than one protocol. For example, in some embodiments, the EVSE may be configured to communicate using version 1.6 of the OCCP for functionalities related to monitoring of the EVSE, and may be configured to communicate using version 2.0 of the OCCP for functionalities related to control of charging characteristics of the EVSE. In some embodiments, the EVSE may be configured to communicate via the REST protocol for functionalities related to usage statistics, and is configured to communicate via the web-socket protocol for functionalities related to transactions or charging of the electric bus, or the like. Thus, in some embodiments, the mediator system 200 may be configured to establish multiple connections with a system in the charging control network, and may be configured to use a particular communications protocol based on, for example, the contents of the communication, functionalities associated with the communication, or other criteria.

As noted above, managing the virtualized connection between the EVSE and the plurality of server systems 205 may include managing not only the first connection between the EVSE and the mediator system 200, but also managing the respective second connections between the mediator system 200 and each of the plurality of servers 205. However, in various circumstances, the connection between the mediator system 200 and another system may be lost or interrupted. Thus, in some embodiments, the mediator system 200 may be configured to mediate disruptions to the virtualized connection due to an interruption in one of the connections to the mediator system 200.

Figure 4:
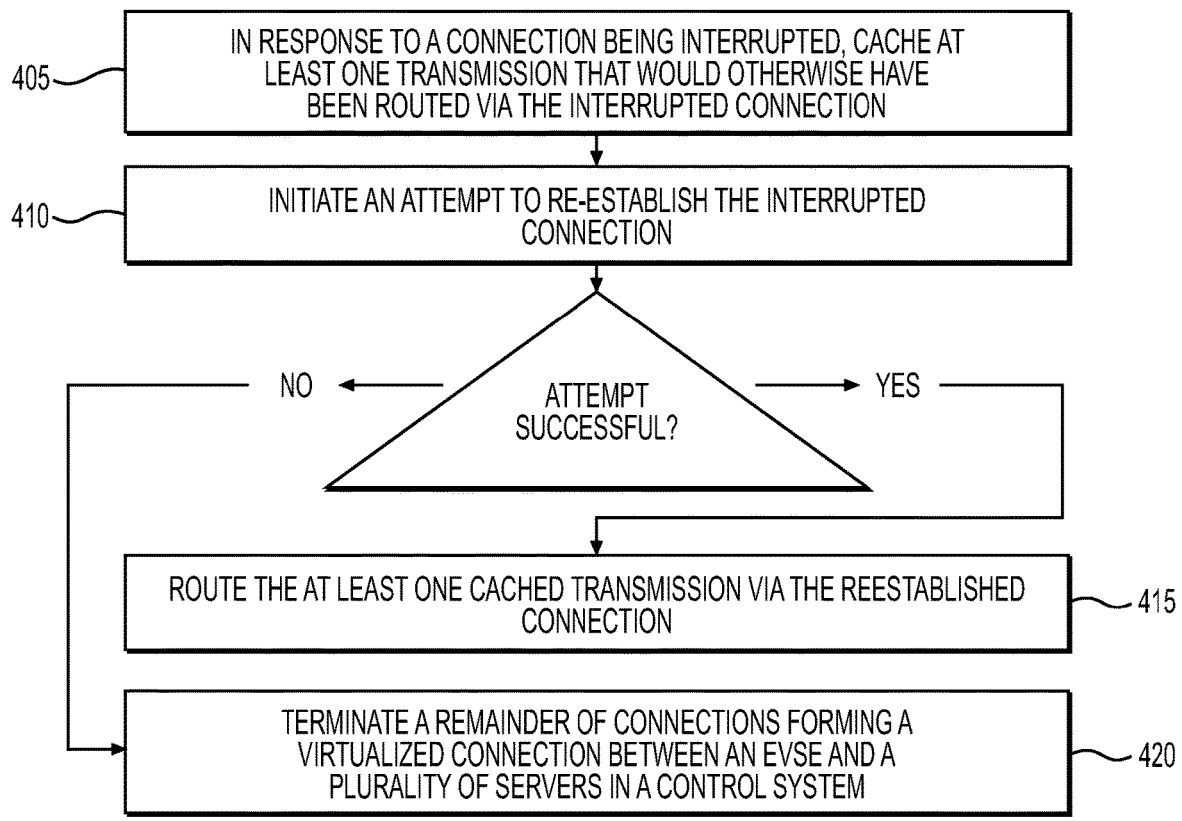
FIG. 4 is a flow diagram depicting an exemplary embodiment of a method for mediating a disruption to the virtualized connection of FIG. 3.

FIG. 4 depicts an exemplary method for mediating a disruption to the virtualized connection. At step 405, in response to a connection with the mediator system 200 being interrupted, e.g., one of the first connection with the EVSE or one of the respective second connections with one of the plurality of server systems 205, the mediator system 200 may be configured to cache at least one request, reply or other transmission that would otherwise have been routed via the interrupted connection. At 410, the mediator system 200 may initiate an attempt to re-establish the interrupted connection. At step 415, in response to the interrupted connection being re-established, the mediator system 200, e.g., via the connection manager module 220, may be configured to route the at least one cached transmission via the re-established connection. Or, at step 420, in response to a failure of the mediator system 200 to re-establish the interrupted connection, the mediator system 200, e.g., via the connection manager module 220, may be configured to terminate a remainder of the connections forming the virtualized connection, e.g., the other of the one of the first connection and the one of the respective second connections.

In some embodiments, the mediator system 200 may not attempt to re-establish the disrupted connection, and thus may not perform step 410. In an exemplary embodiment, the first connection between the EVSE and the mediator system 200 becomes disrupted. In this embodiment, in response to the disruption of the first connection, the mediator system 200 terminates the remainder of the connections forming the virtualized connection with the EVSE, e.g., the respective connections with the plurality of servers 205.

In another exemplary embodiment, one of the respective second connections between a server system and the mediator system 200 becomes disrupted. In this embodiment, the mediator system 200 is configured to cache any incoming transmissions from the EVSE that would otherwise be routed to the disrupted server (step 405), attempt to re-establish the disrupted second connection (step 410), and pass along any cached transmissions to the server system in response to the disrupted second connection being re-established.

FIG. 5 depicts an exemplary embodiment of a method for maintaining the virtualized connection between the EVSE and the plurality of server systems 205 in the charging network. At step 505, in response to receiving a first request from the EVSE, the mediator system 200 may selectively route the first request to one or more of the plurality of server system 205. At step 510, the mediator system 200, in response to receiving at least one first reply to the first request from the selected one or more of the plurality of server systems 205, may selectively route one, and only one, of the at least one first replies to the EVSE. At step 515, the mediator system 200, in response to receiving a second request from one of the plurality of server systems 205, whereby the second request is directed toward the EVSE, may route the second request to the EVSE. At step 520, the mediator system 200, in response to receiving a second reply to the second request from the EVSE, may route the second reply to the one of the plurality of server systems 205 that transmitted the second request. Each of these steps is discussed in further detail below.

With regard to step 505, in some embodiments, the selectively routing of the first request to the one or more server systems from amongst the plurality of server systems may include applying, e.g., via the rule engine module 225, the predetermined set of rules to the first request to identify one or more server systems relevant to the first request. The mediator system 200 may then route the first request to the identified one or more systems.

As noted above, in some embodiments, functionalities for the charging control network may be divided into or associated with groups or categories. In some embodiments, applying the predetermined set of rules may include determining, based on the predetermined set of rules, at least one category associated with the first request. Further, as also noted above, in some embodiments, servers in the plurality of servers 205 may have predetermined associations with one or more categories. Thus, in some embodiments, applying the predetermined set of rules further may include comparing the determined category of the first request with predetermined categories of the plurality of server systems, and identifying the one or more server systems as having a predetermined category that matches the category of the first request. For example, the first request may be related to the control of the EVSE, and thus the first request matches a category of control processes associated with the first server system 210 acting as the primary server system for the EVSE, and the first request is routed to the first server system 210. In another example, the first request may be related to monitoring statistical information for the EVSE, and thus the first request matches a category of monitoring processes associated with the second server system 215 acting as the secondary server system, and the first request is routed to both the first server system 210 and the second server system 215.

With regard to step 510, each of the one or more server systems selected at step 505 to receive the first request may transmit a first reply to the first request. As noted above, transmissions from multiple server systems may overlap and/or conflict with each other. Thus, the mediator system 200 may mediate between the plurality of server systems 205 and the EVSE by transmitting one, and only one, of the received at least one first replies to the first request. In various embodiments, the one and only one of the at least one first replies may be selected based on, for example, the ranking(s) of the plurality of servers 205, the one or more categories associated with the first request, one or more categories associated with the at least one first replies, an ordering in which the at least one first replies are received, or other criteria.

For example, in a circumstance in which the first request is routed by the mediator system 200 to a primary server system and to a secondary server system, first replies may be received by the mediator system 200 from each of the primary server system and the secondary server system. The mediator system 200, in some embodiments, may route only the first reply originating from the primary server system to the EVSE. In another example, in a circumstance in which the first request is routed by the mediator system 200 to a secondary server system and a further secondary system, first replies may be received by the mediator system 200 from each of the secondary server system and the further secondary server system. The mediator system 200, in some embodiments, may selectively route only one of the first replies from the secondary server system and the further secondary server system. Such selection may be based on, for example: a comparison between content of the first replies and associations between one or more functionalities for the charging control network and the secondary server system and the further secondary server system; the predetermined set of rules; a timing in which the first replies are received, or other criteria.

In some embodiments, the mediator system 200 may be configured, e.g., based on the rule engine module 225, to transmit a respective first response to one or more of the first replies that are not routed to the EVSE. In some embodiments, the mediator system 200 may transmit a first response indicative that a command included in a first reply was not executed. In some embodiments, a first reply not routed to the EVSE includes a request for information, and the mediator system 200 may transmit a first response that includes the information. In some embodiments, the mediator system 200 may transmit a respective first response based on the first reply that was routed to the EVSE. For example, in some embodiments, the first reply routed to the EVSE causes a status or parameter of the EVSE to be changed, and the mediator system 200 may transmit a respective first response in order to update one or more of the plurality of server systems 205 that may not have otherwise received an indication of the change.

With regard to steps 515 and 520, by routing the second request from a particular server system to the EVSE, and then routing the second reply from the EVSE to that particular server system, the mediator system 200 may enable bidirectional communication via the virtualized connection. In other words, due to the mediation of the mediator system 200, each of the plurality of server system 205 may be able to communicate with the EVSE independently of the other server systems. Moreover, due to the mediation of the mediator system 200, responses from the EVSE may be routed to server systems associated with the response, and server systems may not receive unexpected or conflicting responses to requests from other server systems.

In some embodiments, however, the mediator system 200, e.g., based on the rule engine module 225, may route a second response to a second request from a particular server system to at least one additional server system. For example, a second server system 215 may transmit a second request for a current charging rate of the EVSE as part of a monitoring functionality. The second reply from the EVSE, however, may be relevant to not only the monitoring functionality of the second server system 215, but also to a charging characteristics setting functionality associated with the first sever system 210, and the mediator system 200 may thus route the second reply from the EVSE to both the first server system 210 and the second server system 215.

Figure 6A:
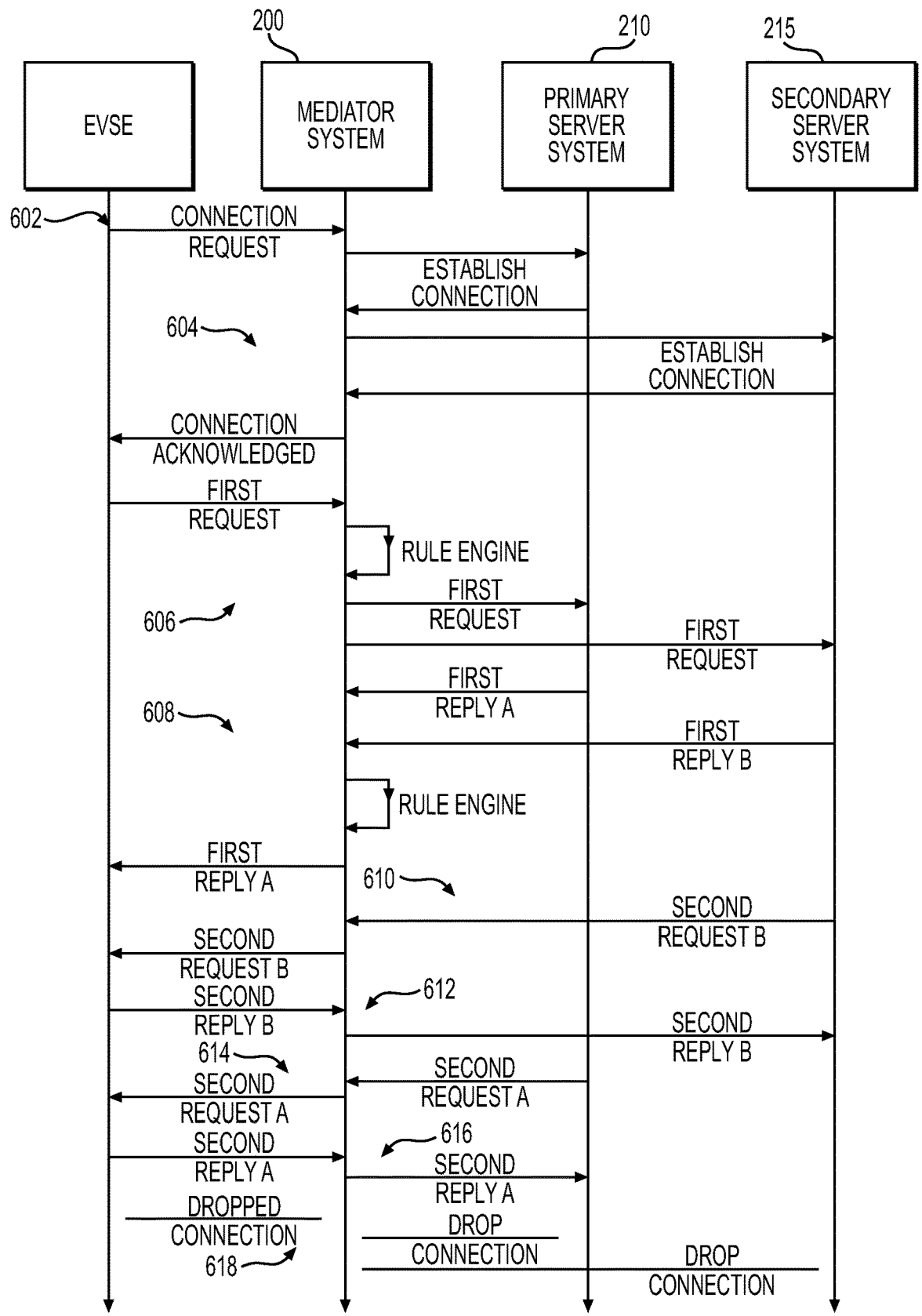
FIG. 6A is a transmission diagram that depicts exemplary communications within an exemplary embodiment of a charging control network.

FIG. 6A depicts a transmission diagram of communications oven an exemplary embodiment of a charging control network. At 602, the EVSE transmits a connection request to the mediator system 200 (e.g., step 305 of FIG. 3). At 604, the mediator system 200 establishes respective second connections with each of a primary server system 210 and a secondary server system 215 (e.g. step 310 of FIG. 3), and forms a virtualized connection between the EVSE and the primary and secondary server systems (e.g., step 315 of FIG. 3). At 606, the EVSE transmits a first request to the mediator system 200, the mediator system 200 applies the predetermined set of rules to the first request via the rule engine module 225 and, based on the application of the predetermined set of rules, routes the first request to each of the primary server system 210 and the secondary server system 215 (e.g., step 505 of FIG. 5). At 608, the mediator system 200 receives first responses from each of the primary server system 210 and the secondary server system 215, and routes only the first response from the primary server system 210 to the EVSE (e.g., step 510 of FIG. 5).

At 610, the mediator system 200 receives a second request from the primary server system 210, and routes the second request to the EVSE (e.g., step 515 of FIG. 5). At 612, the mediator system 200 receives a second reply from the EVSE in response to the second request, and routes the second reply to the primary server system 210 from which the second request originated. At 614, the mediator system 200 receives a second request from the secondary server system 215, and routes the second request to the EVSE (e.g., step 515 of FIG. 5). At 616, the mediator system 200 receives a second reply from the EVSE in response to the second request, and routes the second reply to the secondary server system 215 from which the second request originated. At 618, the mediator system 200 receives an indication that the first connection with the EVSE has been interrupted, dropped, and/or closed. In response to the indication, the mediator system 200 drops and/or closes the respective second connections with the primary server system 210 and the secondary server system 215.

Figure 6B:
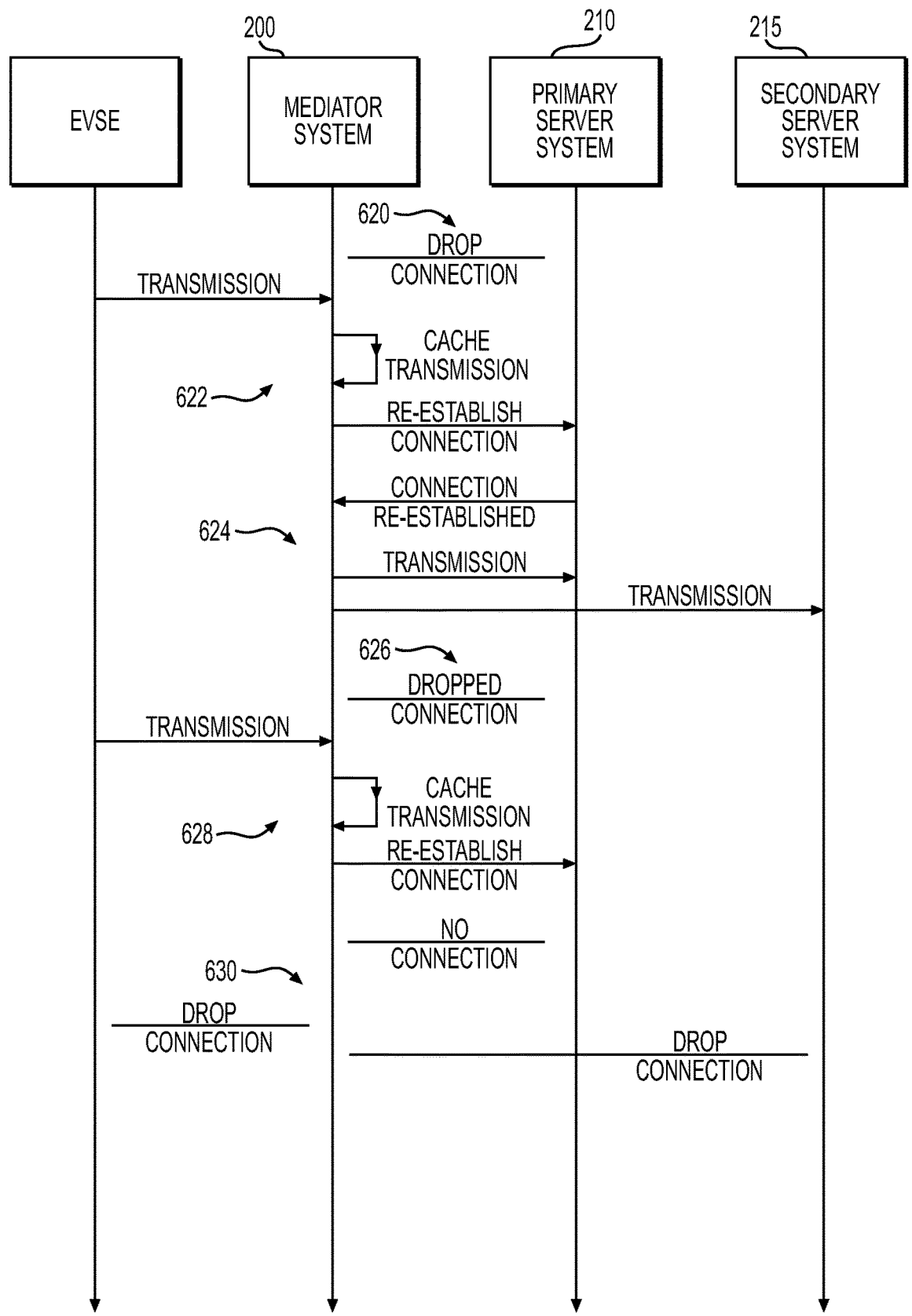
FIG. 6B is another transmission diagram that depicts exemplary communications within an exemplary embodiment of a charging control network.

FIG. 6B depicts another transmission diagram of communications oven an exemplary embodiment of a charging control network. At 620, the mediator system 200 receives an indication that the respective second connection with the primary server system 210 has been dropped, lost, and/or disconnected. At 622, the mediator system 200 receives a transmission from the EVSE, and caches the transmission while attempting to re-establish the respective second connection with the primary server system 210. At 624, in response to successfully re-establishing the respective second connection with the primary server system 210, the mediator system 200 routes the cached transmission to the primary server system 210 and to the secondary server system 215.

At 626, the mediator system 200 receives an indication that the respective second connection with the primary server system 210 has been dropped, lost, and/or disconnected. At 628, the mediator system 200 receives a transmission from the EVSE, and caches the transmission while attempting to re-establish the respective second connection with the primary server system 210. At 630, in response to a failure to re-establish the respective second connection with the primary server system 210, the mediator system 200 drops and/or disconnects the first connection with the EVSE and the respective second connection with the secondary server system 215.

Figure 7:
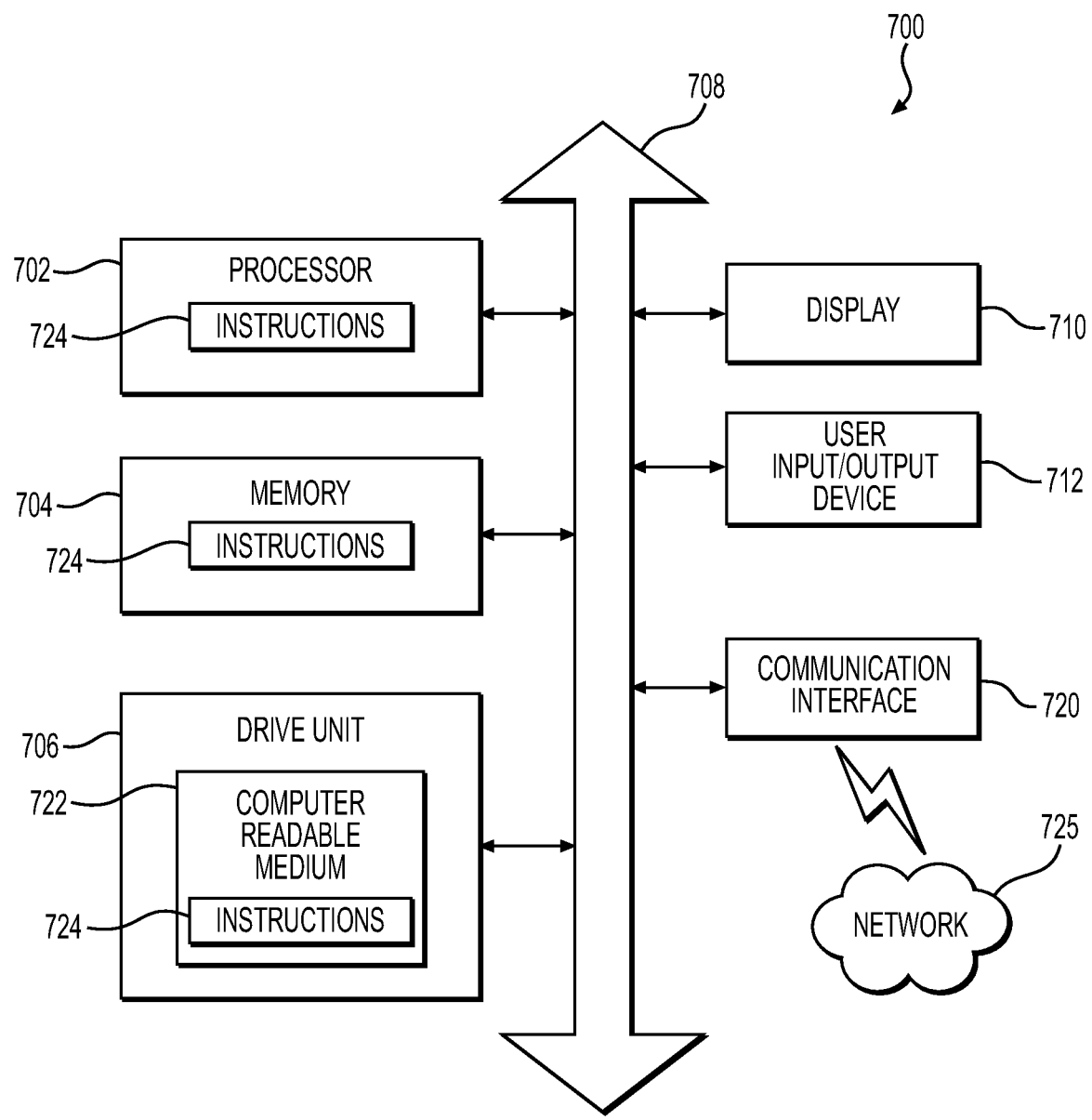
FIG. 7 depicts an example of a computing device, according to aspects of the present disclosure.

FIG. 7 is a simplified functional block diagram of a computer 700 that may be configured as a device for executing the methods and processes of FIGS. 3-6B to mediate between an EVSE and a plurality of server systems, according to exemplary embodiments of the present disclosure. FIG. 7 is a simplified functional block diagram of a computer that may be configured to act as a mediator system, a server system, a system that hosts one or more of a mediator system or a server system as a virtual system, etc. Specifically, in one embodiment, any of the devices/systems, servers, etc., discussed herein may be an assembly of hardware including, for example, a data communication interface 720 for packet data communication. The platform also may include a central processing unit ("CPU") 702, in the form of one or more processors, for executing program instructions. The platform may include an internal communication bus 708, and a storage unit/drive unit 706 (such as ROM, HDD, SDD, etc.) that may store data on a computer readable medium 722, although the computer 700 may receive programming and data via network communications (e.g., via communication interface 720). The computer 700 may also have a memory 704 (such as RAM) storing instructions 724 for executing techniques presented herein, although the instructions 724 may be stored temporarily or permanently within other modules of computer 700 (e.g., processor 702 and/or computer readable medium 722). The computer 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 3-6B, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
    maintaining a virtualized connection between an Electric Vehicle Supply Equipment ("EVSE") comprising a plurality of electric vehicle charging stations in a charging control network and a plurality of server systems in the charging network by:
    in response to receiving a first request from the EVSE, selectively routing the first request to one or more server systems from amongst the plurality of server systems;
    in response to receiving at least one first reply to the first request from the selected one or more server systems, selectively routing one and only one of the at least one first reply to the EVSE;
    in response to receiving a second request from one of the plurality of server systems, the second request directed toward the EVSE, routing the second request to the EVSE; and
    in response to receiving a second reply to the second request from the EVSE, routing the second reply to the one of the plurality of server systems that transmitted the second request.

2. The computer-implemented method of claim 1, further comprising:
    receiving a first connection from the EVSE; and
    in response to receiving the first connection request:
    establishing a respective second connection with each server system in the plurality of server systems; and
    forming the virtualized connection between the EVSE and the plurality of server systems based on the first connection and the respective second connections.

3. The computer-implemented method of claim 2, wherein:
    a first communications protocol for at least one of the first connection or one of the respective second connections is different from a second communications protocol of another; and
    one or more of:
    the first communications protocol is a stateless communications protocol, and the second communications protocol is a stateful communications protocol; or
    the first communications protocol is a first version of a communications protocol, and the second communications protocol is a second version of the communications protocol that is different than the first version.

4. The computer-implemented method of claim 2, wherein the first connection enables communications using a first communication protocol and communications using a second communications protocol different from the first communications protocol.

5. The computer-implemented method of claim 2, further comprising:
    in response to one of the first connection or one of the respective second connections being interrupted:
    caching at least one request or reply that would otherwise be routed via said interrupted connection; and
    attempting to re-establish said interrupted connection;
    in response to said interrupted connection being re-established, routing the at least one cached request or reply via the re-established connection; and
    in response to a failure to re-establish said interrupted connection, terminating a remainder of the one of the first connection and one of the respective second connections.

6. The computer-implemented method of claim 1, wherein the selectively routing of the first request to the one or more server systems from amongst the plurality of server systems includes:
    applying a predetermined set of rules to the first request to identify the one or more server systems as relevant to the first request; and
    routing the first request to the identified one or more server systems.

7. The computer-implemented method of claim 6, wherein applying the predetermined set of rules includes:
    based on the predetermined set of rules, determining a category of the first request; and
    comparing the determined category of the first request with predetermined categories of the plurality of server systems, and identifying the one or more server systems as having a predetermined category that matches the category of the first request.

8. The computer-implemented method of claim 1, wherein:
one of the server systems from amongst the plurality of server systems is assigned as a primary server system to the EVSE;
in response to one of the at least one first replies originating from the primary server system assigned to the EVSE, the one and only one of the at least one of the first reply that is routed to the EVSE is the first reply originating from the primary server system assigned to the EVSE;
at least one of the server systems from amongst the plurality of server systems other than the primary server system is assigned as at least one secondary server system to the EVSE;
the virtualized connection enables the primary server system to apply at least one control process to the EVSE; and
the virtualized connection enables the at least one secondary server system to apply at least one monitoring process to the EVSE.

9. A control system for a charging control network, comprising:
a primary server system configured to apply at least one control process to an Electric Vehicle Supply Equipment comprising a plurality of electric vehicle charging stations ("EVSE") in the charging control network;
at least one secondary server system configured to apply at least one monitoring process to the EVSE; and
a mediator system configured to maintain a virtualized connection between the EVSE and both of the primary server system and the at least one secondary server system to resolve at least one of overlapping and conflicting transmissions of the primary server system and the at least one secondary server system based on a rank of the primary server system and the at least one secondary server system, the mediator system including a processor and a memory operatively connected to the processor, and storing instructions executable by the processor to perform acts that include:
in response to receiving a first request from the EVSE, selectively routing the first request to one or more of the primary server system or the at least one secondary server systems based on a set of predetermined rules;
in response to receiving at least one first reply to the first request from the selected one or more of the primary server system or the at least one secondary server systems, selectively routing one and only one of the at least one first reply to the EVSE;
in response to receiving a second request from one of the primary server system or one of the at least one secondary server systems, the second request directed toward the EVSE, routing the second request to the EVSE; and
in response to receiving a second reply to the second request from the EVSE, routing the second reply to the one of the primary server system or one of the at least one secondary server systems that transmitted the second request.

10. The control system of claim 9, wherein the acts further include, in response to receiving a first connection from the EVSE:
establishing a respective second connection with each of the primary server system and the at least one secondary server system; and
forming the virtualized connection between the EVSE, the primary server system, and the at least one secondary server system based on the first connection and the respective second connections.

11. A mediator system for a control system of a charging control network, the mediator system comprising:
a processor; and
a memory operatively connected to the processor, and storing instructions executable by the processor to perform acts that include:
maintaining a virtualized connection between an Electric Vehicle Supply Equipment ("EVSE") comprising a plurality of electric vehicle charging stations in the charging control network and a plurality of server systems in the charging network by:
selectively routing a first request to one or more server systems from amongst the plurality of server systems, the first request being from at least one of the plurality of electric vehicle charging stations of the EVSE;
selectively routing one and only one of a first reply, in response to the first request, from the selected one or more server systems to the EVSE;
selectively routing a second request from one of the plurality of server systems to the EVSE; and
selectively routing a second reply, in response to the second request, to the one of the plurality of server systems that transmitted the second request.

12. The mediator system of claim 11, wherein the acts further include:
receiving a first connection from the EVSE; and
in response to receiving the first connection request:
establishing a respective second connection with each server system in the plurality of server systems; and
forming the virtualized connection between the EVSE and the plurality of server systems based on the first connection and the respective second connections.

13. The mediator system of claim 12, wherein a first communications protocol for at least one of the first connection or one of the respective second connections is different from a second communications protocol of another.

14. The mediator of claim 13, wherein one or more of:
the first communications protocol is a stateless communications protocol, and the second communications protocol is a stateful communications protocol; or
the first communications protocol is a first version of a communications protocol, and the second communications protocol is a second version of the communications protocol that is different than the first version.

15. The mediator system of claim 12, wherein the first connection enables communications using a first communication protocol and communications using a second communications protocol different from the first communications protocol.

16. The mediator system of claim 12, wherein the acts further include, in response to one of the respective second connections being interrupted:
attempting to re-establish said interrupted connection;
caching at least one request or reply that would otherwise be routed via said interrupted connection; and
in response to said interrupted connection being re-established, routing the at least one cached request or reply via the re-established connection.

17. The mediator system of claim 12, wherein the acts further include: in response to the first connection being interrupted, terminating the respective second connections.

18. The mediator system of claim 11, wherein the selectively routing of the first request to the one or more server systems from amongst the plurality of server systems includes:

applying a predetermined set of rules to the first request to identify the one or more server systems as relevant to the first request; and routing the first request to the identified one or more server systems.

19. The mediator system of claim 18, wherein applying the predetermined set of rules includes:

based on the predetermined set of rules, determining a category of the first request; and comparing the determined category of the first request with predetermined categories of the plurality of server systems, and identifying the one or more server systems as having a predetermined category that matches the category of the first request.

20. The mediator system of claim 11, wherein:

one of the server systems from amongst the plurality of server systems is assigned as a primary server system to the EVSE;

in response to one of the at least one first replies originating from the primary server system assigned to the EVSE, the one and only one of the at least one of the first reply that is routed to the EVSE is the first reply originating from the primary server system assigned to the EVSE;

at least one of the server systems from amongst the plurality of server systems other than the primary server system is assigned as at least one secondary server system to the EVSE;

the virtualized connection enables the primary server system to apply at least one control process to the EVSE; and the virtualized connection enables the at least one secondary server system to apply at least one monitoring process to the EVSE.

* * * * *